(12) United States Patent
Hwang

(10) Patent No.: US 6,549,875 B2
(45) Date of Patent: Apr. 15, 2003

(54) METHOD FOR MEASURING DOOR SEALING GAP OF VEHICLE

(75) Inventor: Woo-Dong Hwang, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/999,363

(22) Filed: Oct. 23, 2001

(65) Prior Publication Data

US 2002/0052710 A1 May 2, 2002

(30) Foreign Application Priority Data

Oct. 30, 2000 (KR) .......................... 2000-63976

(51) Int. Cl.[7] .............................................. G01B 11/24
(52) U.S. Cl. ........................................ 702/167; 702/155
(58) Field of Search .................................. 702/155, 167; 277/921; 296/146.9; 49/475.1

(56) References Cited

U.S. PATENT DOCUMENTS 5,657,550 A * 8/1997 Struble ........................ 33/548

FOREIGN PATENT DOCUMENTS

JP 05026632 A * 2/1993 .......... H04N/5/208

* cited by examiner

Primary Examiner—John Barlow
Assistant Examiner—Anthony Dougherty
(74) Attorney, Agent, or Firm—Christie, Parker & Hale, LLP

(57) ABSTRACT

Disclosed is a method for measuring a door sealing gap of a vehicle in which a coordinate system is generated using reflectors and laser beams, and wherein 3D CAD data is trace-rotated using the coordinate system to measure a sealing gap for weather-stripping between a door panel and a side-out panel, in order to optimally facilitate weather-stripping design and placement to properly seal a door to a vehicle body when it is closed.

3 Claims, 6 Drawing Sheets

METHOD FOR MEASURING DOOR SEALING GAP OF VEHICLE

CROSS-REFERENCE TO RELATED APPLICATION

This application claims priority of Korea patent Application No. 10-2000-0063976, filed on Oct. 30, 2000.

BACKGROUND OF THE INVENTION (a) Field of the Invention

The present invention relates to a method for measuring a door sealing gap of a vehicle. More particularly, the present invention relates to a method for measuring a door sealing gap of a vehicle in which a coordinate system is generated using reflectors and laser beams, and 3D CAD data is trace-rotated using the coordinate system to measure a sealing gap for weather-stripping between a door panel and a side-out panel.

(b) Description of the Related Art

Weather-stripping is typically mounted to a door panel of a vehicle and provides a variety of functions. For example, weather-stripping acts to absorb shock generated between the door panel and side-out panel when the door is closed. Also, weather-stripping helps to seal the passenger compartment so that air is prevented from entering or exiting the passenger compartment, and to prevent or minimize the entrance of external noises into the passenger compartment. To design weather-stripping so that it can better perform these functions, the sealing gap, that is the gap between the door panel and the sideout panel, must be precisely measured. With such precise measurements, weather-stripping can be designed to better perform its functions.

Using conventional methods to measure the gap, with reference to FIG. 6, one person is positioned within the passenger compartment and another person is positioned outside the vehicle, and a gap ruler is used to measure internal and external gaps "a" and "b" of a door panel 51 and a side-out panel 53, which are sealed by weather-stripping 55. This measurement is performed in a state where the door is mounted to the vehicle and closed.

However, precise measurements are not possible with such crude techniques, and human error is highly likely.

SUMMARY OF THE INVENTION

The present invention has been made in an effort to solve the above problems.

It is an object of the present invention to provide a method for measuring a door sealing gap of a vehicle, in which a coordinate system is generated using reflectors and laser beams, and 3D CAD data is trace-rotated using the coordinate system to measure a sealing gap for weather-stripping between a door panel and a side-out panel.

To achieve the above object, the present invention provides a method for measuring a door sealing gap comprising the steps of establishing a base coordinate system based on a car line coordinate system by detecting NC holes of a block base on which a vehicle body and a door are placed and generating the base coordinate system; converting the base coordinate system into an established coordinate system so that a laser measuring unit can recognize the base coordinate system as the car line coordinate system; generating a reference rotational axis by detecting hinge holes that are used for mounting the door onto the vehicle body, displaying the hinge holes in real-time through a controller, and setting a line passing through center points of the hinge holes as the reference rotational axis; mounting the door to the vehicle body, and mounting reflectors at predetermined positions at areas around a window opening in the door; generating initial reflector position values, in a state where the door is closed, by irradiating laser beams onto the reflectors using the laser measuring unit, then detecting reflected laser beam signals and outputting position information signals to the controller, after which the received signals are used to generate initial reflector position values for performing rotation about the reference rotational axis; measuring, in a state where the door is open, positions of the reflectors using the laser measuring unit and outputting corresponding signals to the controller, then scanning specific areas for measuring the sealing gap using a probe; displaying surface data of the specific areas scanned in the above step in real-time, and performing CAD data trace-rotation in which the surface data is rotated to the measured initial position centered about the reference rotational axis; and determining a sealing gap based on the surface data of the specific areas.

According to a feature of the present invention, the base coordinate system is a six-direction coordinate system.

According to another feature of the present invention, the surface data of the specific areas are realized through 3D CAD data.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
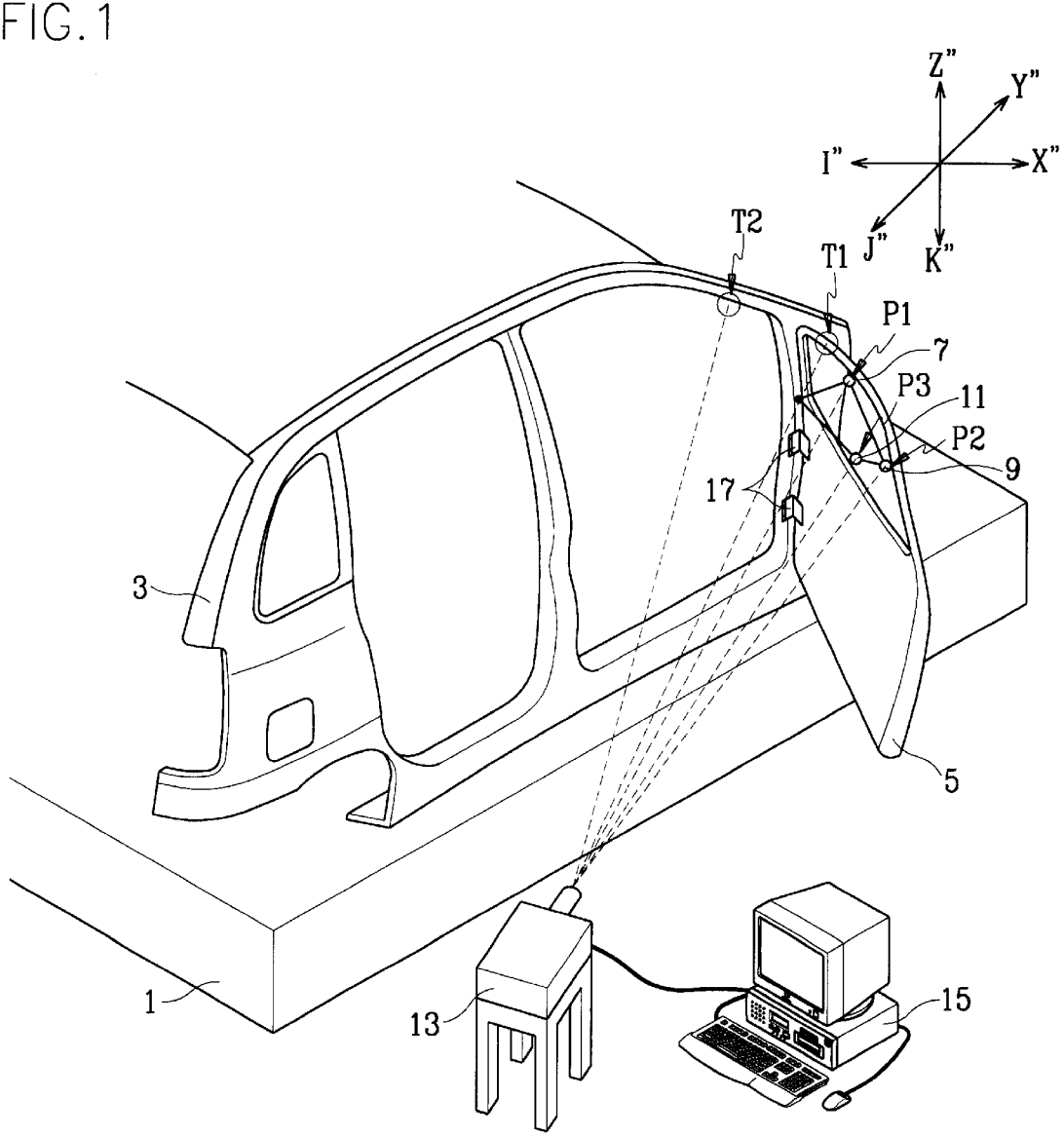
FIG. 1 is a schematic view of a door sealing gap measuring system and related elements according to a preferred embodiment of the present invention.

FIG. 1 is a schematic view of a door sealing gap measuring system and related elements according to a preferred embodiment of the present invention.

In a door sealing gap measuring system and related elements to which a method of the present invention is applied, a vehicle body 3 is placed on a block base 1, and a door 5 is mounted to the vehicle body 3. At this time, the vehicle body 3 is usually in a white-state. Reflectors 7, 9 and 11 are mounted respectively to three positions P1, P2 and P3 around a window opening in the door 5.

A laser measuring unit 13 is provided at a predetermined position and irradiates laser beams onto the reflectors 7, 9 and 11. The laser measuring unit 13 then detects reflected laser beam signals and outputs position information signals. A controller 15 receives the signals output by the laser measuring unit 13 and applies them as 3D CAD.

Figure 2:
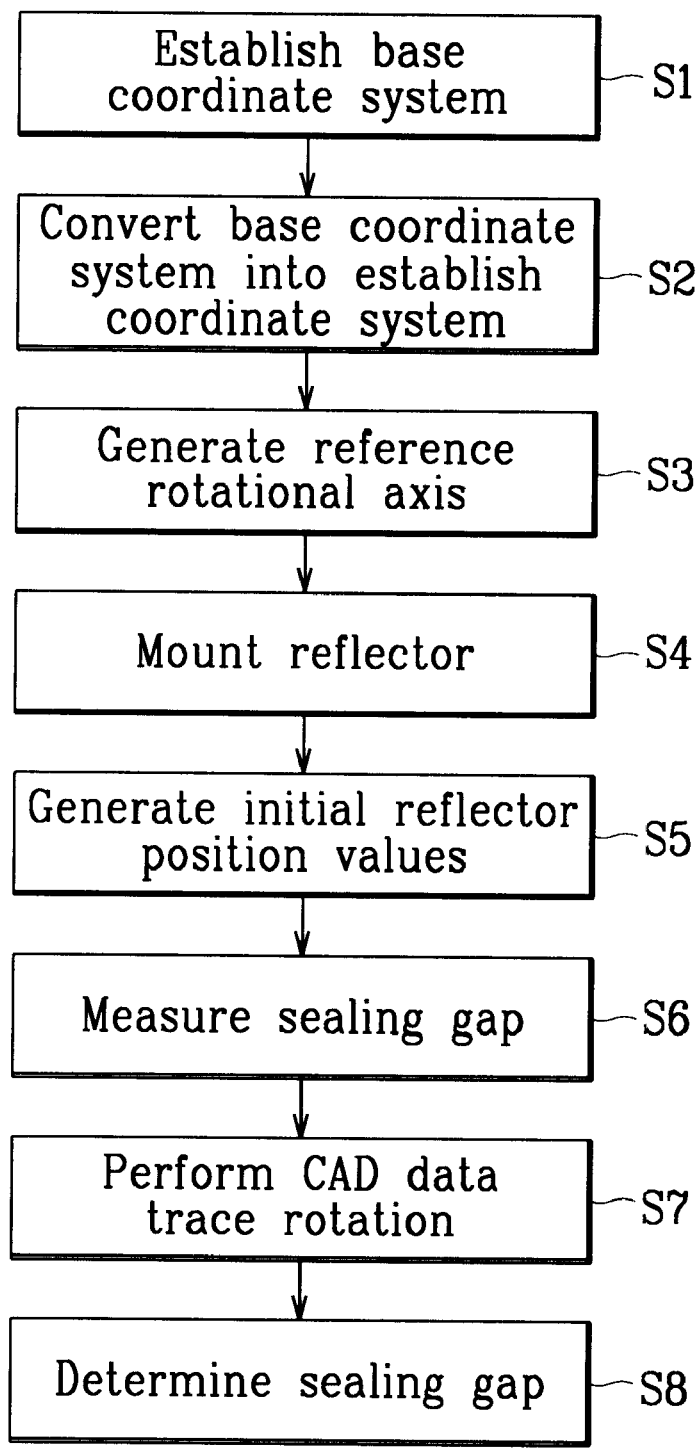
FIG. 2 is a flow chart of a method for measuring a door sealing gap according to a preferred embodiment of the present invention.

FIG. 2 shows a flow chart of a method for measuring a door sealing gap according to a preferred embodiment of the present invention.

Figure 3:
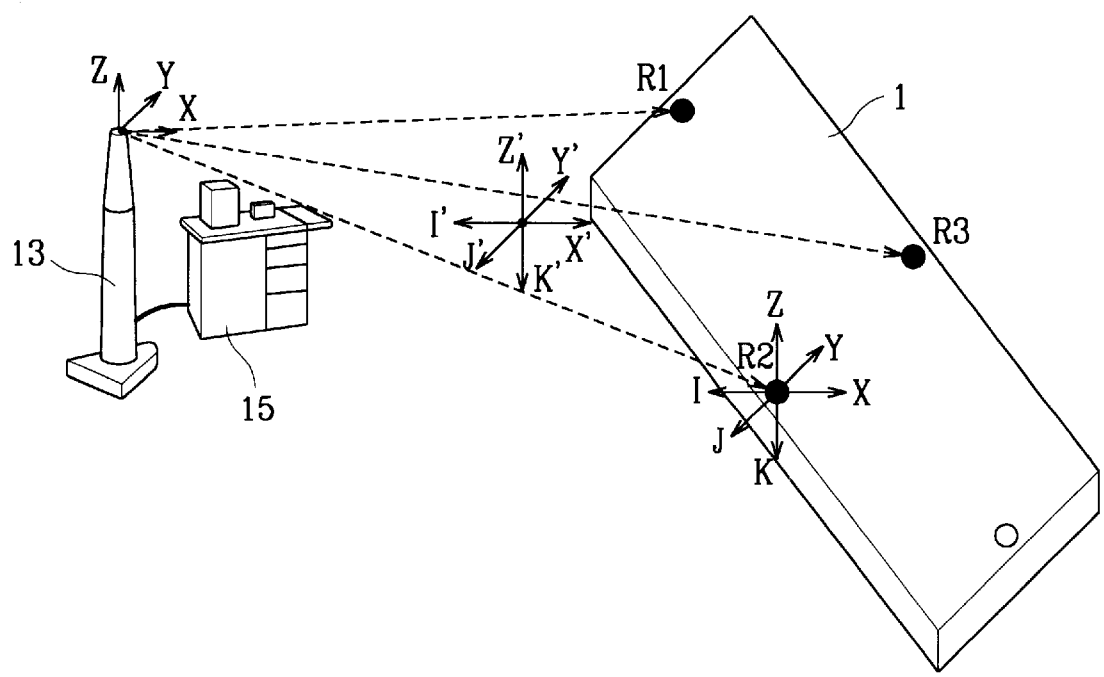
FIG. 3 is a drawing used to describe a process for establishing a coordinate system in the method of the present invention of FIG. 2.

First, a base coordinate system is established in step S1. That is, with reference to FIG. 3, a laser beam is irradiated by the laser measuring unit 13 in sequence onto first, second and third reflectors R1, R2 and R3. The reflectors R1, R2 and R3 are mounted in jig NC holes of the block base 1, the positions of the NC holes being precisely known based on a coordinate system (X',Y',Z',I',J',K') of a car line. The laser measuring system 13 then calculates a wavelength of laser beams reflected back onto sensor heads of the laser measuring system 13 such that distances are determined.

One of the jig NC holes of the block base 1 (the second reflector R2) is then established as the origin, and an X-Y plane is formed based on a line connecting two other points (the first and third reflectors R1 and R3). A line normal to the plane is set as the Z-axis, and the remaining directions of the coordinate system are then determined based on the three established directions. Accordingly, a six-direction coordinate system (X,Y,Z,I,J,K) is generated in step S1.

Next, the base coordinate system (X,Y,Z,I,J,K) is converted into an established coordinate system (X",Y",Z",I",J",K") in step S2. That is, a controller, which controls the laser measuring unit 13, performs conversion of the base coordinate system (X,Y,Z,I,J,K) into the established coordinate system (X",Y",Z",I",J",K") so that the laser measuring unit 13 can recognize the base coordinate system (X,Y,Z,I,J,K) as the car line coordinate system.

Figure 4:
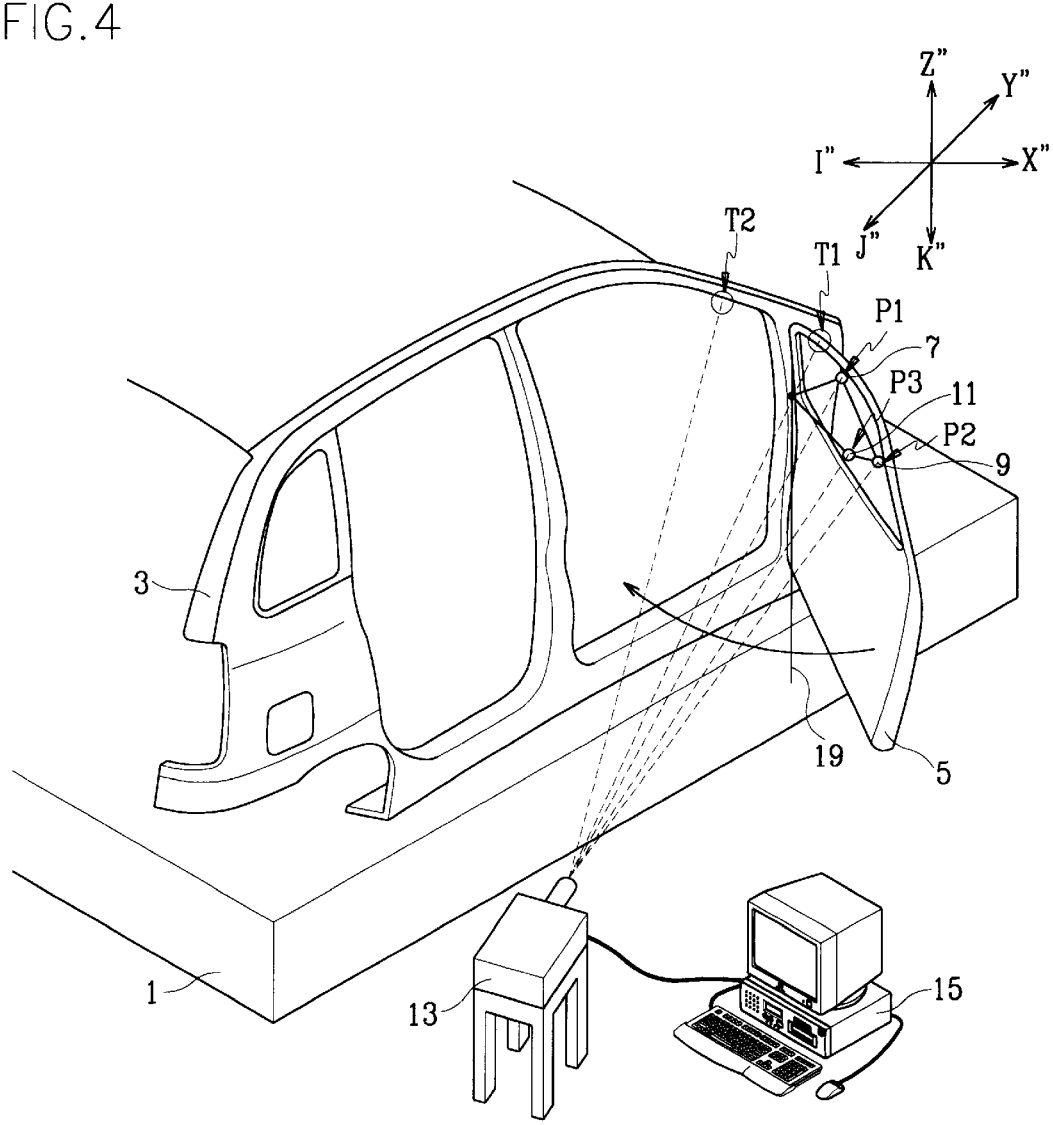
FIG. 4 is a drawing used to describe a process for generating a reference rotating axis in the method of the present invention of FIG. 2.
Figure 5:
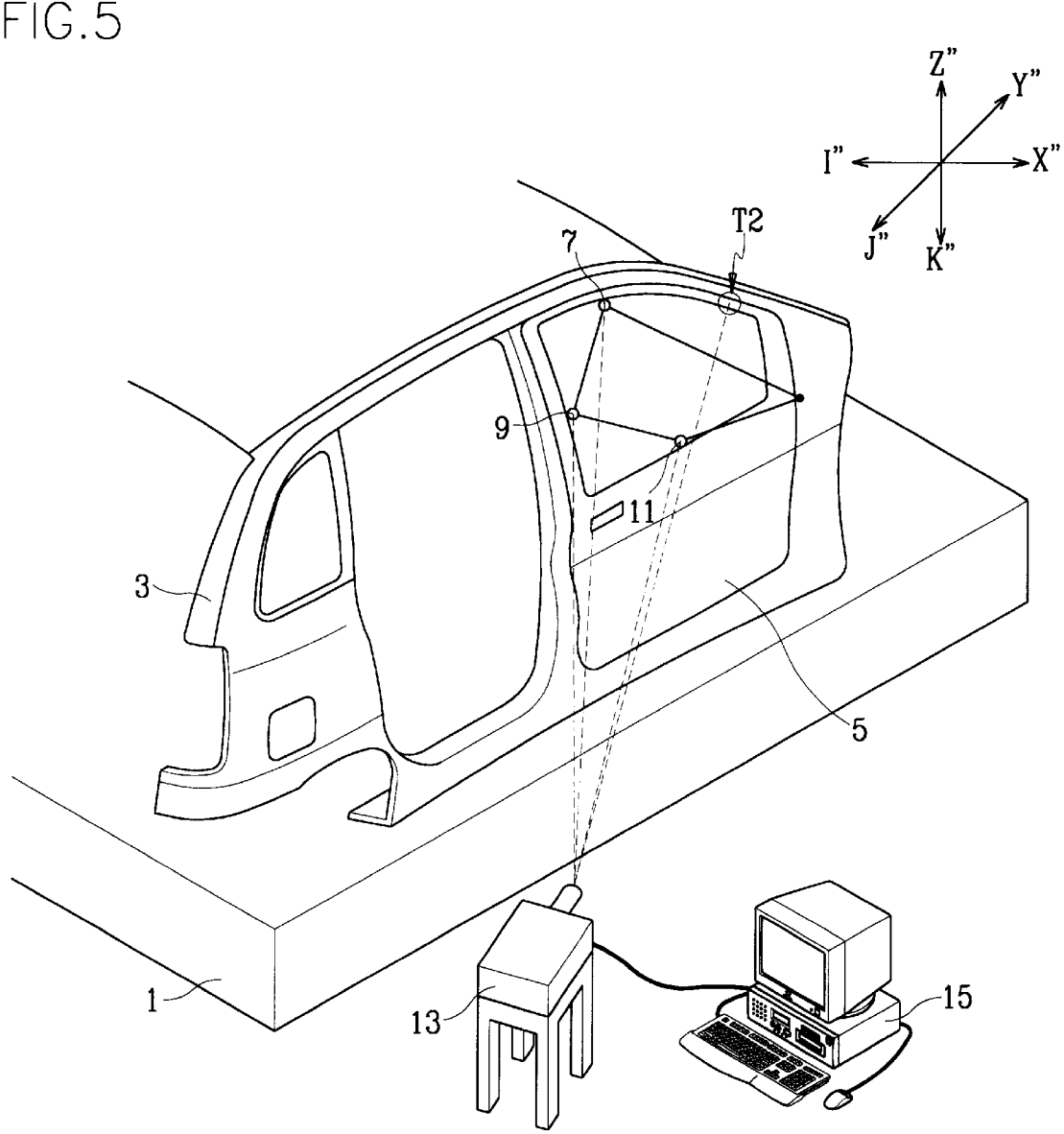
FIG. 5 is a drawing used to describe a process for trace-rotating CAD data in the method of the present invention of FIG. 2.
Figure 6:
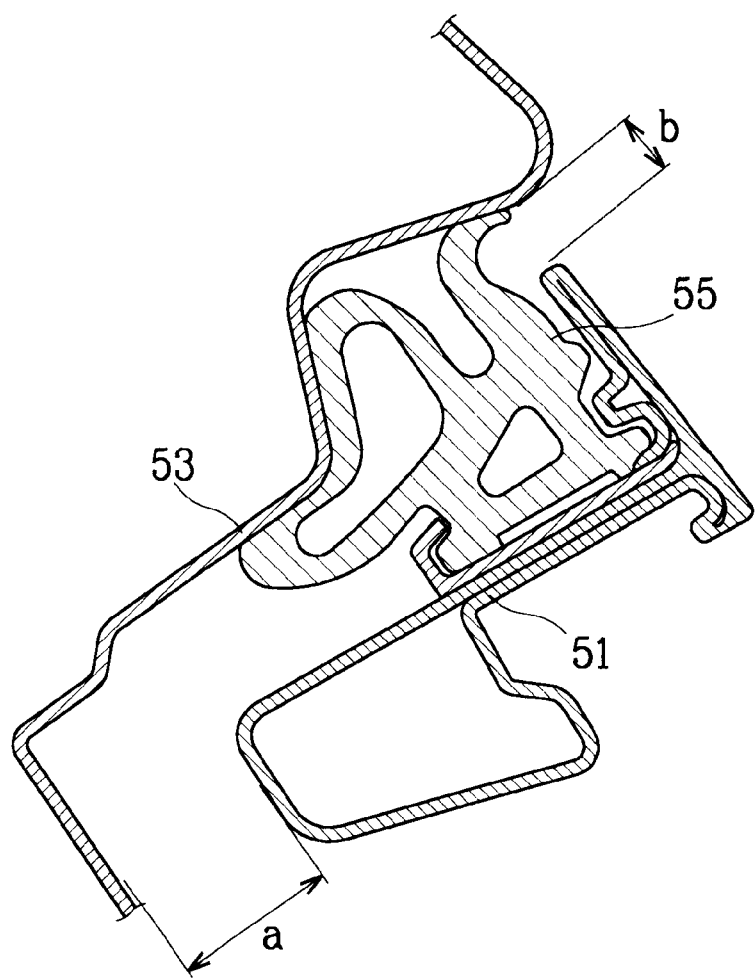
FIG. 6 is a schematic view of various door elements used to describe a conventional method for measuring a door sealing gap.

Following step S2, a reference rotational axis 19 is generated in step S3. That is, with reference to FIG. 4, hinge holes 17 that are used for mounting the door 5 onto the vehicle body 3 are detected and displayed in real-time through the controller 15. A line through the center of the hinge holes 17 is then set as the reference rotational axis 19.

Subsequently, in step S4, after mounting the door 5 to the vehicle body 3, the reflectors 7, 9 and 11 are mounted to the positions P1, P2 and P3, which are designated at areas around the window opening in the door 5. This enables detection of the positions P1, P2 and P3 by the laser measuring unit 13.

Next, in a state where the door 5 is closed, the laser measuring unit 13 irradiates laser beams onto the reflectors 7, 9 and 11 then detects reflected laser beam signals and outputs position information signals to the controller 15. The controller 15 uses the received signals to generate initial reflector position values for performing rotation about the reference rotational axis 19 in step S5.

After step S5, in a state where the door 5 is open, the laser measuring unit 13 measures positions of the reflectors 7, 9 and 11 and outputs corresponding signals to the controller 15. Specific areas T1 and T2 for measuring the sealing gap are then scanned using a probe (not shown) in step S6.

Surface data realized through 3D CAD data of the specific areas T1 and T2 scanned in step S6 are displayed in real-time through the controller 15, and, in step S7, CAD data trace-rotation is performed in which the surface data is again rotated to the initial position measured in step S5 centered about the reference rotational axis 19 generated in step S3. Finally, a sealing gap is determined in step S8 based on the surface data of the specific areas T1 and T2.

In the above method for measuring a door sealing gap of a vehicle of the present invention, by precisely measuring the sealing gap, weather-stripping of optimal dimensions can be designed such that the weather-stripping better absorbs the shock generated between the door panel and side-out panel when the door is closed, and the passenger compartment is better sealed.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for measuring a door sealing gap comprising the steps of:

establishing a base coordinate system based on a car line coordinate system by detecting NC holes of a block base on which a vehicle body and a door are placed and generating the base coordinate system;

converting the base coordinate system into an established coordinate system so that a laser measuring unit can recognize the base coordinate system as the car line coordinate system;

generating a reference rotational axis by detecting hinge holes that are used for mounting the door onto the vehicle body, displaying the hinge holes in real-time through a controller, and setting a line passing through center points of the hinge holes as the reference rotational axis;

mounting the door to the vehicle body, and mounting reflectors at predetermined positions at areas around a window opening in the door;

generating initial reflector position values, in a state where the door is closed, by irradiating laser beams onto the reflectors using the laser measuring unit, then detecting reflected laser beam signals and outputting position information signals to the controller, after which the received signals are used to generate initial reflector position values for performing rotation about the reference rotational axis;

measuring, in a state where the door is open, positions of the reflectors using the laser measuring unit and outputting corresponding signals to the controller, then scanning specific areas for measuring the sealing gap using a probe;

displaying surface data of the specific areas scanned in the above step in real-time, and performing CAD data trace-rotation in which the surface data is rotated to the measured initial position centered about the reference rotational axis; and determining a sealing gap based on the surface data of the specific areas.

2. The method of claim 1 wherein the base coordinate system is a six-direction coordinate system.

3. The method of claim 1 wherein the surface data of the specific areas are realized through 3D CAD data.

* * * * *